United States Patent [19]

Amstutz et al.

[11] Patent Number: 4,634,229
[45] Date of Patent: Jan. 6, 1987

[54] LIQUID CRYSTAL DISPLAY

[75] Inventors: Hermann Amstutz, Mellingen; Dieter Heimgartner, Baden; Meinolph Kaufmann, Baden-Rütihof; Terry J. Scheffer, Forch, all of Switzerland

[73] Assignee: BBC Brown, Boveri & Company Limited, Baden, Switzerland

[21] Appl. No.: 626,380

[22] Filed: Jun. 29, 1984

[30] Foreign Application Priority Data

Jul. 12, 1983 [CH] Switzerland .................. 3819/83
Oct. 28, 1983 [CH] Switzerland .................. 5835/83

[51] Int. Cl.⁴ ............................................. G02F 1/13
[52] U.S. Cl. .................................... 350/346; 350/341; 350/350 R
[58] Field of Search ............... 350/341, 346, 350 R

[56] References Cited

U.S. PATENT DOCUMENTS

| | | | |
|---|---|---|---|
| 4,362,771 | 12/1982 | Umeda et al. | 350/343 X |
| 4,496,220 | 1/1985 | Goscianski | 350/341 |
| 4,505,548 | 3/1985 | Berreman et al. | 350/341 X |
| 4,521,080 | 6/1985 | Funada et al. | 350/341 |
| 4,564,266 | 1/1986 | Durand et al. | 350/346 X |
| 4,579,425 | 4/1986 | Ishii et al. | 350/346 |

FOREIGN PATENT DOCUMENTS

| | | |
|---|---|---|
| 2747147 | 5/1978 | Denmark . |
| 2416519 | 8/1979 | France . |
| 57-133438 | 8/1982 | Japan . |
| 2017327 | 10/1974 | United Kingdom . |
| 2076554 | 12/1981 | United Kingdom . |
| 2087583 | 5/1982 | United Kingdom . |

OTHER PUBLICATIONS

B. P. Application 82 18821 filed Jun. 29, 1982, published Jan. 25, 1984, Raynes.
JP Publ. 57-133438 publ. Aug. 18, 1982, (Hitachi 1).
JP Publ. 60-5011 publ. Mar. 20, 1985, (Hitachi 2).
JP Publ. 6a73525 publ. Apr. 25, 1985, (Hitachi 3).
JP Publ. 60-162225 and 60-162226 publ. Aug. 24, 1985, (Hitachi 4).

*Primary Examiner*—John K. Corbin
*Assistant Examiner*—Richard F. Gallivan
*Attorney, Agent, or Firm*—Oblon, Fisher, Spivak, McClelland, & Maier

[57] ABSTRACT

A liquid crystal display based on the bistability effect, wherein the distance between the support plates is smaller than 10 μm and the total twist of the liquid crystal is between 180° and 360°, preferably about 270°. Over the entire viewing area of the display, randomly distributed spacers are provided. Because of these measures, the range of the bistable action is so narrowed that the display can be driven with operating voltages outside this range, using conventional multiplexing techniques. A high degree of multiplexing with short switching times and excellent contrast is obtained. The range of viewing angles is very large and independent of the direction of illumination.

16 Claims, 11 Drawing Figures

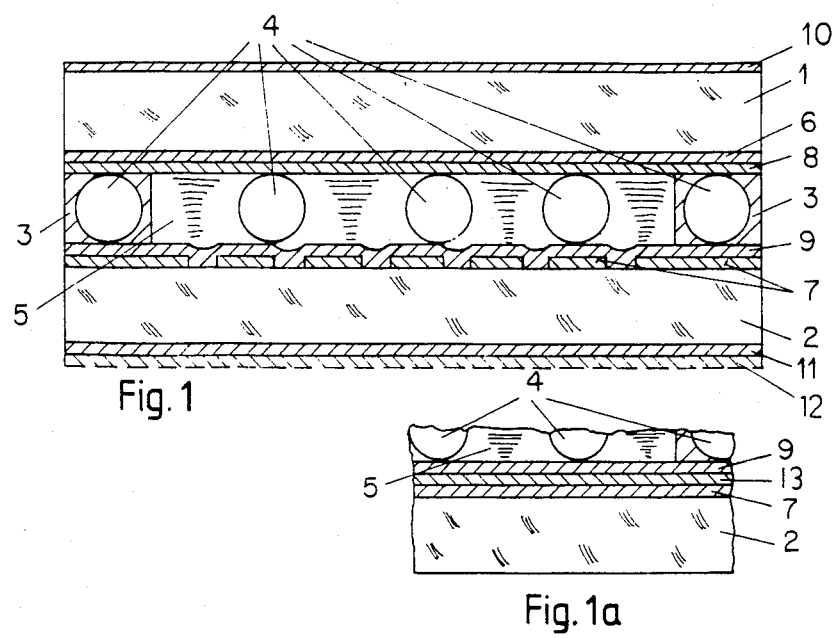
Fig. 1
Fig. 1a
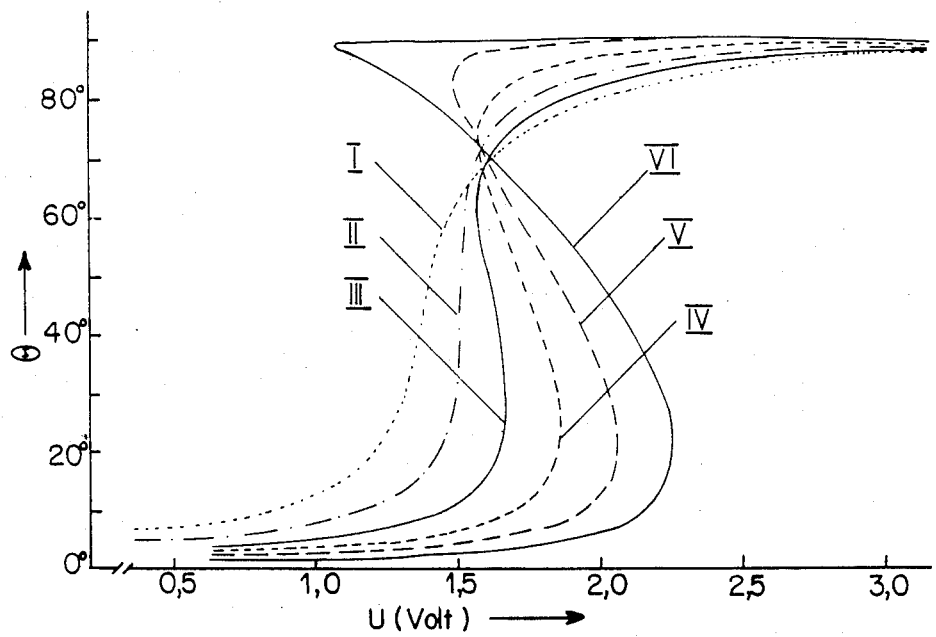
Fig. 2

LIQUID CRYSTAL DISPLAY

BACKGROUND OF THE INVENTION

1. Field of the Invention

This invention relates to a liquid crystal display of the type known, e.g. from J. Appl. Phys., Vol. 53, No. 12 (December 1982), pages 8599 to 8606.

2. Description of the Prior Art

This liquid crystal display described in the above-noted reference functions according to the bistability effect and consists of a cell with two plane-parallel glass plates separated by means of spacers at the border of the cell and bonded together on only two sides. The distance between the glass plates is about 15 μm. It is expressly mentioned that dust particles in the cell and disturbances on the surface of the glass plates are unfavorable for such a display. These phenomena accelerate the disappearance of the displayed information, which is unavoidable with these driving methods. The display must therefore be constantly refreshed.

The display cell is located between two crossed polarizers. Electrode layers and orientation layers formed over the electrode layers are provided on the inner surfaces of the glass plates. The orientation layers are produced by oblique vacuum deposition of SiO at a 5° angle to the plate plane. As a result, the adjoining liquid crystal molecules are aligned with a tilt angle of 55° perpendicular to the plate. The directions of orientation of the orientation layers are either parallel or perpendicular to the transmission axes of the polarizers. A cyanobiphenyl mixture E7 with the chiral additive cholesteryl nonanoate is filled into the cell as the liquid crystal. The internal twist angle of the liquid crystal is 360°; the ratio between layer thickness and pitch is 0.983. A range of from 0.95 to 1.10 is regarded as appropriate for this ratio. Below 0.95, the switching times are very long, so that this range is to be excluded for such a display. Moreover, the aim is for flawless bistable action of the display, for which layer thickness and pitch ought to be about the same. The display is driven either according to the 3:1 addressing scheme or according to the 2:1 addressing scheme in both of which the writing is done line-at-a-time. Since the display must be constantly refreshed, only a few lines can be written. This means that the degree of multiplexing is low and that a dot matrix display with a large number of lines is not achievable according to the above reference.

SUMMARY OF THE INVENTION

Accordingly, the objects of this invention are to provide a novel liquid crystal display based on the bistability effect, which makes possible a steady display without refreshing, which can be driven according to the usual multiplexing technique with a high degree of multiplexing and which possesses a wide range of viewing angles with a high contrast.

The above objects are achieved by providing a liquid crystal display according to the invention which is based on the knowledge that the voltage range over which bistable behavior occurs in a bistable-type display can be narrowed by simultaneously decreasing the total twist angle within the layer and the ratio between layer thickness and pitch of the liquid crystal. In fact, this voltage range can be narrowed to such an extent that a high degree of multiplexing can be achieved using conventional multiplexing techniques with driving voltages lying outside of this range. Thereby the magnitude of the total twist angle of the liquid crystal within the display cell should be between 180° and 360°. In addition the separation between the two support plates should be less than 10 μm, by which especially the switching times can be considerably shortened.

The invention now makes possible a liquid crystal display based on the bistability effect which is especially suitable for large dot matrix displays, exhibits rapid switching times and has a very large range of viewing angles with high contrast.

BRIEF DESCRIPTION OF THE DRAWINGS

A more complete appeciation of the invention and many of the attendant advantages thereof will be readily obtained as the same becomes better understood by reference to the following detailed description when considered in connection with the accompanying drawings, wherein:

FIG. 1 is a cross-sectional view of the display according to the invention;

FIG. 1a is a cross-sectional view of a liquid crystal display including an internal reflector;

FIG. 2 is a graph illustrating curves with the total twist angle $\phi$ of the liquid crystal as a parameter with the operating voltage U and the tilt angle $\theta$ in the middle of the layer as variables;

DESCRIPTION OF THE PREFERRED EMBODIMENTS

Figure 3:
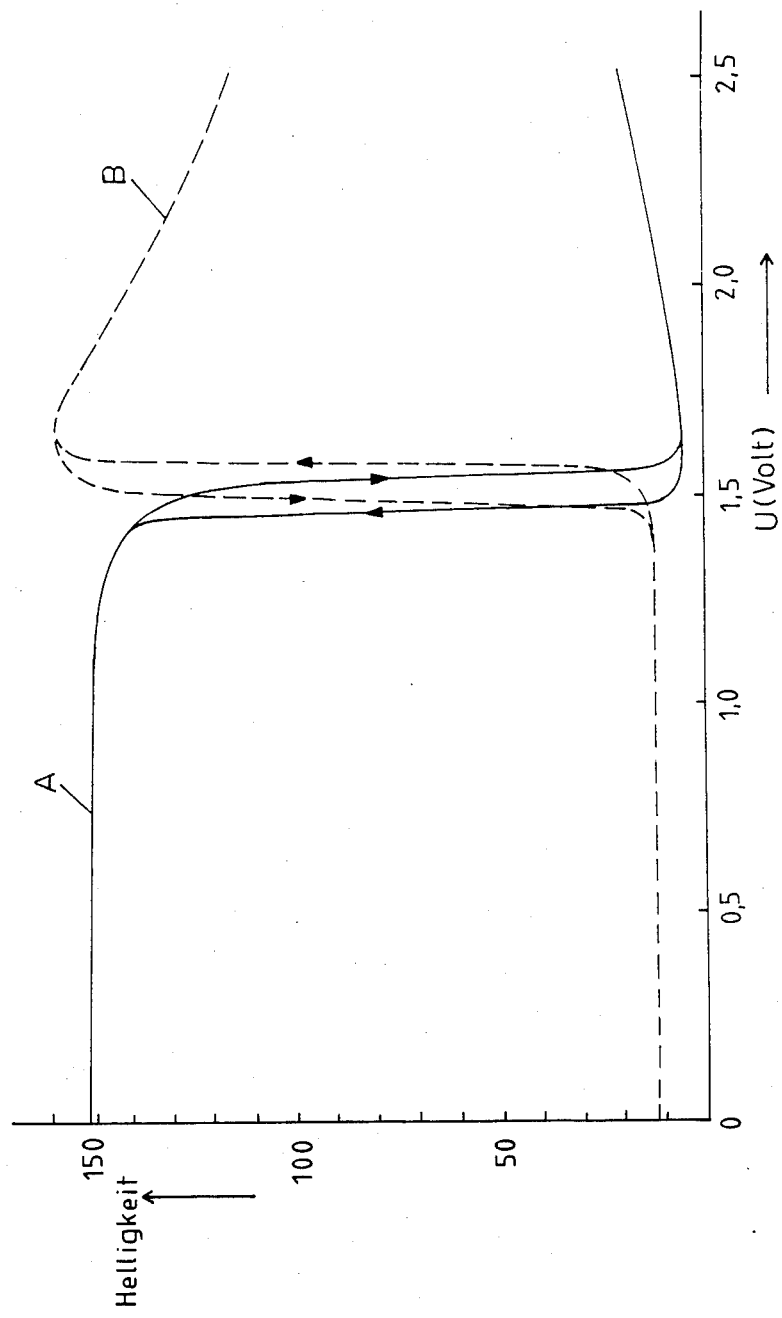
FIG. 3 is a graph illustrating contrast curves for a reflective display cell including two polarizers.

Referring now to the drawings, wherein like reference numerals designate identical or corresponding parts throughout the several views, the liquid crystal display shown in FIG. 1 consists of two glass support plates 1 and 2 which form a cell with a border 3. The border 3, as usual, consists of an epoxy cement which contains glass fiber spacers 4. Additional spacers 4 are randomly distributed between the support plates 1 and 2 over the entire viewing area of the display. A nematic liquid crystal 5 with positive dielectric anisotropy containing a chiral additive is filled into the cell. The inner surfaces of each support plate 1 and 2 have parallel strips of $In_2O_3$ electrode layers 6 and 7, whereby the direction of the strips on the one support plate 1 is perpendicular to the direction of the strips on the other support plate 2. In this manner, a dot matrix display is formed. But other electrode shapes are also possible, such as, e.g., the known seven-segment arrangement. Orientation layers 8 and 9 are applied over the electrode layers 6 and 7 and over the the spaces between these electrode layers. A linear sheet-type linear polarizer 10 is bonded to the outside of the front support plate 1. For transmissive operation a linear polarizer 11 is also bonded to the outside of the rear support plate 2. For reflective operation, a diffusely scattering, metallic, external reflector 12 is placed behind this polarizer 11 (indicated by the dashed line in FIG. 1). Such a reflector is known, e.g. from CH-B-618018. The polarizer 11 can also be left out. By this means the brightness is improved but the contrast ratio is lowered.

In FIG. 1a, the situation is shown when, instead of an external reflector 12, an internal reflector 13 is used, as is known, e.g. from EP-B-060380. As the section shows, this reflector is placed between the electrode layer 7 and the orientation layer 9. Otherwise, except for the polarizer 11, the same elements are present as in FIG. 1.

FIG. 2 represents, for a typical liquid crystal, the theoretical relation between the tilt angle $\theta$ of the local optical axis (i.e. the director) of the liquid crystal in the middle of the layer and the applied operating voltage U. The angle $\theta$ was measured in relation to the support plate. The tilt angle of the liquid crystal on the support plate in both cases amounts to 28°. The parameter $\phi$, the total twist angle of the liquid crystal within the display cell, runs through the values 210° (curve I), 240° (curve II), 270° (curve III), 300° (curve IV), 330° (curve V) and 360° (curve VI). At a specific layer thickness d of the liquid crystal, the pitch p is so chosen that the d/p ratio is described by the following formula:

$$d/p = \phi/360° \qquad (1)$$

This guarantees that the twisted state of the liquid crystal layer is stable and not twisted by an additional ±180° and that no optical disturbances occur in the display. The values of 210°, 240°, 270°, 300°, 330° and 360° therefore correspond to a d/p ratio of 0.58, 0.67, 0.75, 0.83, 0.91 and 1.0. The pitch p is defined in accordance with common usage as the characteristic amount of natural twist produced in the undisturbed nematic liquid crystal by the addition of a chiral additive. The pitch is counted as positive in a system with right-handed twist and negative in a system with left-handed twist.

It is essential to this invention that the magnitude of the ratio of layer thickness d to pitch p of the liquid crystal be in the range of 0.50 to 0.95, preferably between 0.65 and 0.85. The pitch p is adjusted by adding a specific weight percent of a chiral additive to the nematic liquid crystal. The weight percent depends on the type of liqud crystal and chiral additive and on the layer thickness d. Furthermore, it is important that at least one of the orientation layers 8 or 9 aligns the adjoining liquid crystal molecules with a tilt angle greater than 5°, preferably with about 10° to 40°. In this connection, care is to be taken that the alignment of the orientation layers 8 and 9 agree with the natural rotation sense of the liquid crystal 5 doped with the chiral additive. Furthermore, the layer thickness d should be less than 10 μm and the total twist angle $\phi$ within the display cell should be between 180° and 360°, preferably between 240° and 300°. As a result, it is assured that the transfer characteristic of the display, i.e. the transmission curve as a function of applied operating voltage, is sufficiently steep and the range of the bistable behavior is so narrowed that addressing can take place according to the usual multiplexing technique (cf., e.g., IEEE Trans. El. Dev., Vol. ED-21, No. 2, February 1974, pages 146 to 155) with operating voltages outside this range. It was found that within this range the switching times are at least 100 times longer as outside this range. The transfer characteristic of the display has a similar shape to the curves in FIG. 2, except that the negative slope of the curves (here curves III to VI) should be replaced by a bistable region (hysteresis loop).

Another important point is that the product of birefringence $\Delta n$ and layer thickness d of the liquid crystal lies within the range 0.6 μm to 1.4 μm, preferably between 0.8 μm and 1.2 μm.

The operation of the liquid crystal display of this invention in transmission can now be explained as follows: the light linearly polarized by the linear polarizer 10 penetrates the support plate 1 and strikes the liquid crystal aligned on the orientation layer 8 at an angle. Because of the total twist $\phi$ and the double refracting properties of the liquid crystal, the originally linearly polarized light is elliptically but variably polarized, depending upon the applied operating voltage. The orientation direction of the orientation layer 9 and the direction of vibration of the rear linear polarizer 11 also form a certain angle. The term orientation direction used here is understood to be the projection of the direction of the local optical axis of the liquid crystal immediately adjacent to the orientation layer onto the plane of the orientation layer. The direction of vibration of the polarizer is understood to refer to the vibration direction of the electric field vector of the polarized light. The elliptically polarized light leaving the liquid crystal is absorbed in the rear polarizer 11, either almost completely or hardly at all, depending upon whether the principal axis of the elliptically polarized light is perpendicular or parallel to the direction of vibration of the polarizer 11. An optimum contrast is achieved by suitable choice of the above-mentioned angle between the orientation layers 8 and 9 and of the polarizers 10 and 11. This angle has a magnitude lying between 20° and 70°, preferably between 30° and 60°, with the sense being either clockwise or counter-clockwise. The clockwise sense is defined with respect to the incident direction of the light and the angle is taken in reference to the orientation direction of the orientation layer.

In the reflective mode of operation, the operating principle is essentially the same as in the transmissive mode. In particular, the optimum contrast in a system with only one polarizer 10 is determined by appropriate choice of the angle between the direction of vibration of the front linear polarizer 10 and the orientation direction of the first orientation layer 8.

Figure 4:
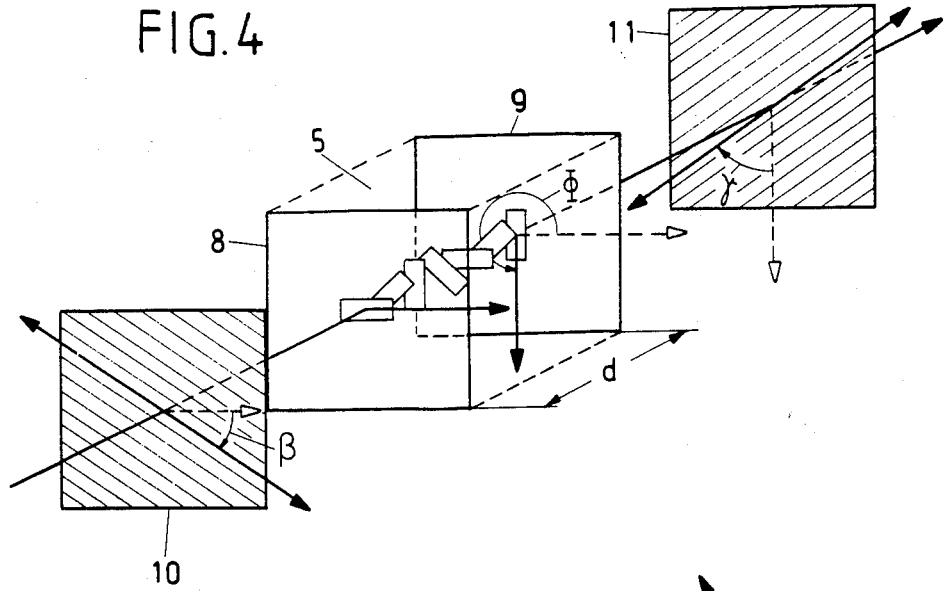
FIG. 4 is an exploded perspective schematic view of the polarizers in a liquid crystal display according to FIG. 1 for a first mode of operation (yellow mode)
Figure 5:
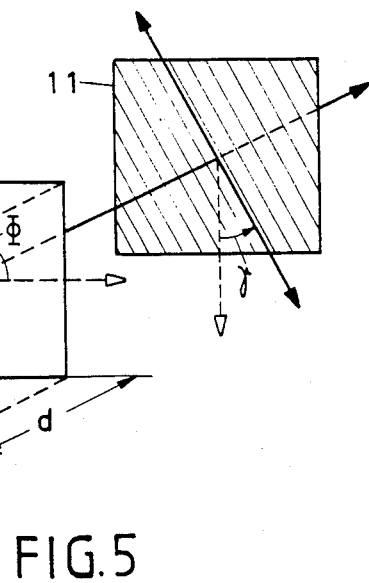
FIG. 5 is an exploded perspective schematic view of the polarizers in a liquid crystal display according to FIG. 1 for a second mode of operation (blue mode)

Because the above-mentioned angle between the direction of vibration of the polarizers 10, 11 and the orientation direction of the orientation layers 8, 9 play an essential role for the attainment of an optimal contrast ratio CR, the way in which these angles are counted will be more precisely explained by means of the schematic arrangements in FIGS. 4 and 5.

FIGS. 4 and 5 show exploded, perspective representations of the arrangement of the polarizers 10 and 11, the orientation layers 8 and 9 as well as the liquid crystal layer 5 located between these layers. The total twist $\phi$ of the liquid crystal in the layer is made clear by a chain of liquid crystal molecules which are schematically represented by small rectangular platelets. Support plates, border and possible reflectors have been left out for sake of clarity. The elements of the cell are arranged along an axis pointing along the propagation direction of the incident light. The direction of vibration of the polarizers 10 and 11 as well as the orientation direction of the orientation layers 8 and 9 are also indicated by arrows which lie in the corresponding planes perpendicular to the above-mentioned axis of the cell.

This axis (incident direction of the light) defines a right-handed coordinate system in which angles are counted as positive in the clockwise sense and negative in the counter-clockwise sense. The examples of the liquid crystal molecules in the cases of FIGS. 4 and 5 therefore form a left-handed screw which has a twist angle $\phi$ of $-270°$ in going out from the front orientation layer 8.

The vibration directions of the polarizers 10 and 11 are rotated from the orientation directions of the orientation layers 8 and 9, represented by the dashed lines in the polarizer planes, by the angles $\beta$ and $\gamma$. In the arrangement shown in FIG. 4, both angles $\beta$ and $\gamma$ are positive. In the arrangement shown in FIG. 5, only $\beta$ is positive, whereas $\gamma$ is negative. In the following description, the angle specifications always refer to the rules laid down in FIGS. 4 and 5.

The invention has especially proven to be useful in a reflective display cell with a layer thickness d of 7.6 μm and a total twist angle $\phi$ of the liquid crystal of $-270°$. The d/p ratio in this case is $-0.75$. The first orientation layer 8 is produced by oblique vacuum deposition of SiO at an angle of 5° to the plate plane and aligns the adjoining liquid crystal molecules in such a way that the tilt angle between the local optical axis of the liquid crystal at the orientation layer and the projection of this optical axis on the plane plate, i.e. the orientation direction, amounts to 28°. The direction of vibration of the front polarizer 10 and the orientation direction of the orientation layer 8 form an angle of about 30°. The second orientation layer 9 is a rubbed polymer layer which gives a tilt angle of 1°. However, an orientation layer similar to the first one is also possible. The liquid crystal 5 consists of the nematic mixture ZLI-1840 from the firm of Merck, FRG, with 2.05 percent by weight of the chiral additive cholesteryl nonanoate. This liquid crystal has a positive dielectric anisotropy of $+12.2$ and a birefringence of 0.15. The temperature range extends from 258 K to 363 K, and the viscosity is $1.18 \times 10^{-4}$ m²/s at 273 K and $3.1 \times 10^{-3}$ m²/s at 293 K.

With this display cell, 96 lines can be addressed using the usual multiplexing techniques. The operating voltages are 1.90 V for the non-selected state (dark) and 2.10 V for the selected state (bright). In the bright state, the display is completely achromatic, in the dark condition it is deep blue. If, additionally, an optical retardation plate, such as, e.g., a $\lambda/4$ plate, is used between the front linear polarizer 10 and the front support plate 1, the color of the display can be correspondingly changed. It has an excellent range of viewing angles independent of the direction of the illumination. The on and off switching times of the display are 0.4 s at 296 K.

Another especially preferred embodiment of the invention consists of a reflective display cell with a 0.7 mm thick support plate 1 and a 0.5 mm thick support plate 2. The layer thickness is 6.5 μm. This display cell is provided with a front polarizer 10, a rear polarizer 11 and an external reflector 12. Both orientation layers 8 and 9 are prepared by oblique vacuum deposition of SiO at an angle of 5° to the plate plane. These layers orient the neighboring liquid crystal molecules in such a way that the optical axis of the liquid crystal forms a tilt angle of 28° with respect to the plate plane. The orientation layer 8 and 9 are arranged so that the total twist $\phi$ makes a left-handed spiral of $-250°$. As the liquid crystal 5, the nematic mixture ZLI-1840 with a chiral additive of 2.56 weight percent of cholesteryl nonanoate is filled into the cell. The birefringence $\Delta n$ of ZLI-1840 is 0.15, so that the product $\Delta n \times d = 0.975$. The angle $\beta$ between the vibration direction of the front linear polarizer 10 and the orientation direction of its associated orientation layer 8 and the angle $\gamma$ between the vibration direction of the rear linear polarizer 11 and the orientation direction of its associated orientation layer 9 are $\pm 45°$. Contrast curves are given in FIG. 3 for the case that both angles are $+45°$ or $-45°$ (curve A), and for the case that one angle is $+45°$ and the other angle is $-45°$, or vice-versa, (curve B). The abscissa indicates the applied voltage U in volts and the ordinate indicates the brightness in arbitrary units. In the first case (curve A) one obtains a bright yellow display in the non-select state and a black display in the select state. This case corresponds to the arrangement shown in FIG. 4 where both angles $\beta$ and $\gamma$ are chosen to have the same sign, positive or negative (yellow mode). In the second case (curve B) one obtains a deep violet display in the non-select state and a bright display in the select state. This case corresponds to the arrangement shown in FIG. 5 where the angles $\beta$ and $\gamma$ are chosen to have opposite sign (blue mode). The measurements were carried out in normally incident light using a Tektronix Model J 6523 photometer. This photometer takes into account the spectral sensitivity function of the human eye. The voltage was swept at a rate of 30 mV/s. The measured contrast ratios at a multiplexing rate of 100:1 are as follows:

| curve A | $V_s = 1.580$ V<br>$V_{ns} = 1.429$ V | contrast ratio = 19.8 |
|---|---|---|
| curve B | $V_s = 1.609$ V<br>$V_{ns} = 1.456$ V | contrast ratio = 11.8 |

The voltages $V_s$ and $V_{ns}$ are the usual select and non-select addressing voltages as given in the article appearing in IEEE Trans. El. Dev. that was already mentioned. The ratio $V_s/V_{ns}$ is then 1.106 for a multiplex rate of 100:1.

In using two polarizers having angles $\beta$ and $\gamma$ relative to the orientation directions according to FIGS. 4 and 5, two general conditions were found which should be fulfilled for an optimized contrast ratio. These conditions can be described as follows:

| (2) | $\beta + \gamma \approx \pm 90°$ | (FIG. 4) |
|---|---|---|
| or | | |
| (3) | $\beta + \gamma \approx 0°$ | (FIG. 5) |

In both cases the range of angles is limited so that $20° \leq |\beta| \leq 70°$ and $20° \leq |\gamma| \leq 70°$ is valid.

When condition (2) is fulfilled (e.g. $\beta = \gamma = \pm 45°$) then one obtains (curve A in FIG. 3) a bright yellow display in the non-select state (yellow mode). If, on the other hand, condition (3) is fulfilled, then one obtains (curve B in FIG. 3) a deep violet display in the non-select state (blue mode).

Figure 6:
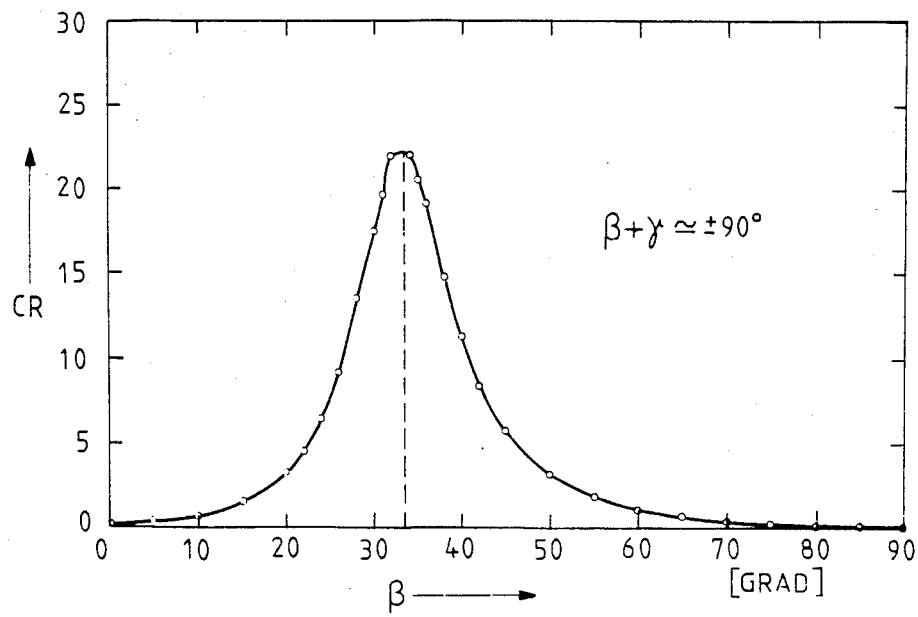
FIG. 6 is a graph illustrating the measured contrast ratio CR as a function of the polarizer orientation in an arrangement according to FIG. 4.
Figure 7:
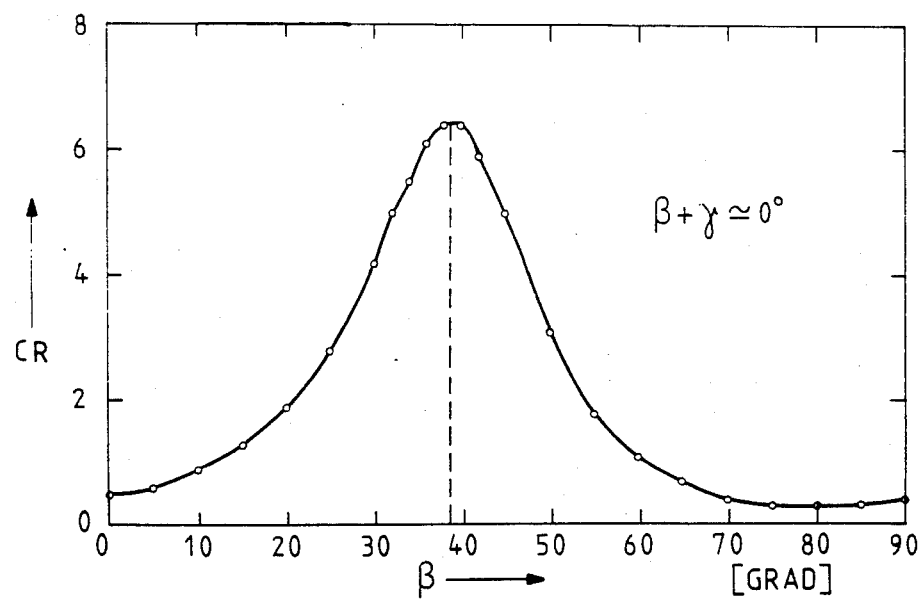
FIG. 7 is a graph illustrating the results corresponding to FIG. 6 for an arrangement according to FIG. 5.

That conditions (2) and (3) are not sufficient conditions for an optimal contrast ratio can be seen from the curves in FIGS. 6 and 7. These curves show the measured contrast ratio CR as a function of the angle $\beta$ under the conditions (2) or (3) for a cell with two linear polarizers in the transmissive mode of operation.

A liquid crystal mixture consisting of 95.6 wt. % ZLI-2392 (Merck), 2.5 wt. % S 811 (Merck) and 1.9 wt. % CB 15 (BDH) was used for these measurements. The total layer twist angle was $-270°$, the surface tilt angle 24°, the layer thickness 6.3 $\mu$m and the birefringence 0.15.

The results illustrated in FIG. 6 are for the yellow mode ($\beta+\gamma \approx \pm 90°$) and those in FIG. 7 correspond to the blue mode ($\beta+\gamma \approx 0°$). It is recognized that the angle $\beta$ lies around 32° for an optimal contrast ratio CR of about 22:1 in the yellow mode, clearly deviating from 0°.

In the blue mode (FIG. 7) the maximum contrast ratio CR of about 6.5:1 is clearly lower. Here also $\beta$ is about 38°, lying in an unexpected angle region.

Figure 9:
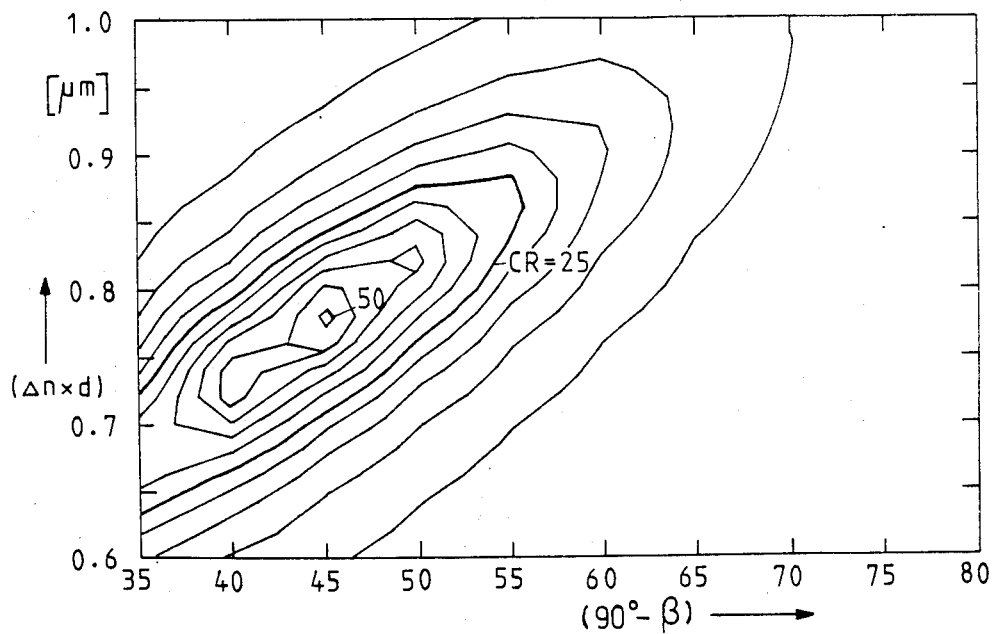
FIG. 9 is a graph illustrating the curves corresponding to FIG. 8 for an arrangement according to FIG. 5.
Figure 10:
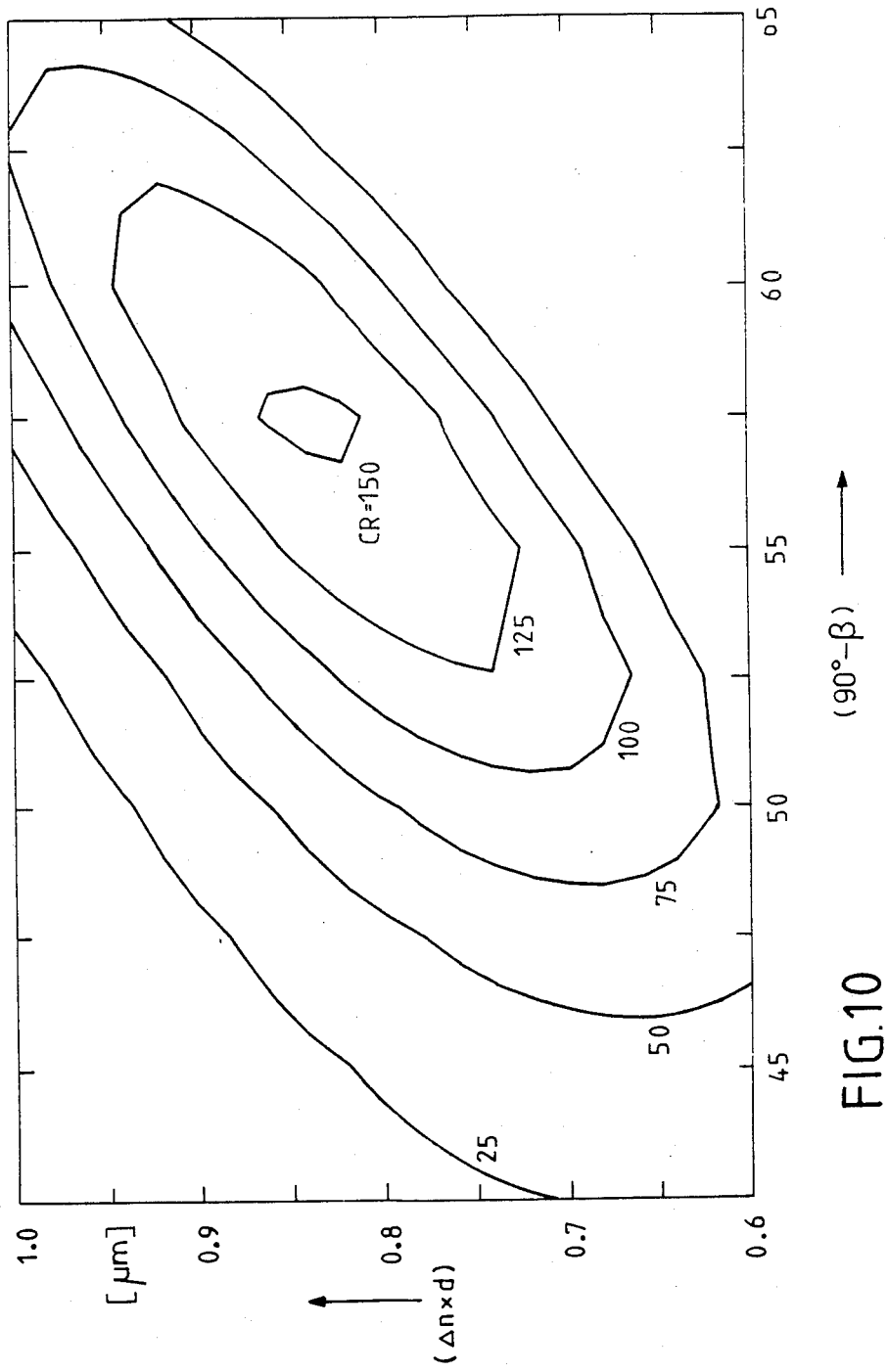
FIG. 10 is a graph illustrating the curves corresponding to FIG. 8 for an arrangement according to FIG. 4.

The surprising values for the angles $\beta$ associated with the optimal contrast ratio CR were confirmed by subsequent theoretical computations. These results are illustrated in FIGS. 8-10 as lines of constant contrast as a function of the product of the layer thickness d and the birefringence $\Delta$n as well as the angle $\beta$.

For these computations a multiplex ratio of 100:1, a layer thickness of $d=6.2$ $\mu$m, an ordinary refractive index $n_o$ of 1.5, liquid crystal elastic constant ratios of $k_{33}/k_{22}=2.5$ and $k_{33}/k_{11}=1.5$, a ratio for the dielectric constants of $(\epsilon_{11}-\epsilon_\perp)/\epsilon_\perp=2.5$, a twist angle of $-270°$ and a ratio of layer thickness to pitch of $d/p=-0.75$ were assumed.

Figure 8:
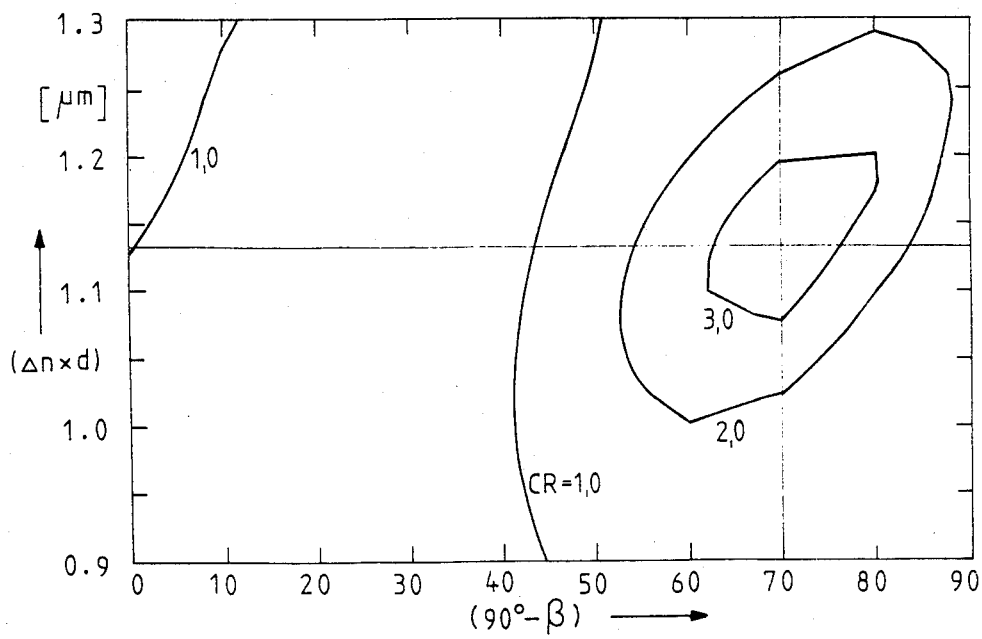
FIG. 8 is a graph illustrating the computed curves of constant contrast ratio as a function of the polarizer orientation and the product $\Delta n \times d$ for an arrangement with one polarizer and one reflector.

FIG. 8 makes it clear that in the case of a cell operating in the reflective mode with one polarizer a maximal contrast ratio CR of about 3.6:1 is only then achieved if the angle $\beta$ is about 20° and $\Delta n \times d$ is approximately 1.13 $\mu$m. For this case a surface tilt angle of 28° was assumed.

In a display cell with two polarizers operating in reflection in the blue mode (FIG. 9) corresponding values of $\beta \approx 45°$ and $\Delta n \times d \approx 0.78$ $\mu$m are obtained.

In the associated yellow mode (FIG. 10) these values amount to $\beta \approx 32.5°$ and $\Delta n \times d \approx 0.84$ $\mu$m. In the last two cases mentioned the surface tilt angle is assumed to be 20°.

The theoretically computed contrast ratios of 50 and 150 lie clearly higher than the measured values because the the computations assumed operation in the reflective mode which gives a better contrast ratio then in the transmissive mode because of the double use of the polarizers.

As a whole this invention makes possible a highly multiplexable, high contrast and fast liquid crystal display having a wide range of viewing angles, which in addition can be manufactured using the proven technology of the conventional TN (Twisted Nematic) display cells.

Obviously, numerous modifications and variations of the present invention are possible in light of the above teachings. It is therefore to be understood that within the scope of the appended claims, the invention may be practiced otherwise than as specifically described herein.

| Designation List | |
|---|---|
| 1, 2 | support plates |
| 3 | border |
| 4 | spacers |
| 5 | nematic liquid crystal |
| 6, 7 | electrode layers |
| 8, 9 | orientation layers |
| 10 | front linear polarizer |
| 11 | rear linear polarizer |
| 12 | external reflector |
| 13 | internal reflector |
| $\phi$ | total twist angle of the liquid crystal within the display cell |
| $\theta$ | tilt angle of the liquid crystal in the middle of the layer |
| U | applied operating voltage |
| d | thickness of the liquid crystal layer |
| p | pitch of the liquid crystal layer |
| $\beta, \gamma$ | angle |

FIG. 3: Helligkeit = brightness

What is claimed as new and desired to be secured by Letters Patent of the United States is:

1. A multiplexable liquid crystal display comprising:
   two plane-parallel support plates which form a cell with inner surfaces and a border;
   a nematic liquid crystal filled into the cell, said nematic liquid crystal having positive dielectric anisotropy and a chiral additive;
   electrode layers formed on the inner surfaces of the support plates;
   orientation layers formed on said electrode layers, at least one said orientation layers aligning adjoining liquid crystal molecules in such a way that a local optical axis of the liquid crystal on said at least one orientation layer has a tilt angle of more than 5° with respect to the respective support plate;
   polarizing means for polarizing light that passes through said cell at least twice between entering and leaving the display;
   said support plates separated by a distance less than 10 um;
   said liquid crystal exhibiting a total twist angle $\phi$ in the cell the absolute value of which is greater than or equal to 180° and smaller than 360°; and
   said liquid crystal having a layer thickness (d) and a pitch (p) wherein the ratio between layer thickness (d) and pitch (p) of the liquid crystal has an absolute value greater than or equal to 0.50 and less than or equal to 0.95.

2. A liquid crystal display as in claim 1, wherein said liquid crystal exhibits a birefringence ($\Delta$n) and the product of the birefringence ($\Delta$n) and layer thickness (d) lies between 0.60 $\mu$m, and 1.40 $\mu$m.

3. A liquid crystal display as in claim 2, wherein the absolute value of the twist angle of the liquid crystal in the cell lies between 240° and 300°.

4. A liquid crystal display as in claim 3, wherein the liquid crystal exhibits a dielectric anisotropy greater than or equal to 5.

5. A liquid crystal display as in claim 3, wherein the magnitude of the twist angle of the liquid crystal in the cell is around 270°.

6. A liquid crystal display as in claim 2, wherein the product of the birefringence ($\Delta$n) and the layer thickness (d) lies between 0.80 $\mu$m and 1.20 $\mu$m.

7. A liquid crystal as in claim 1, wherein the tilt angle on the other orientation layer is smaller than 5°.

8. A liquid crystal display as in claim 1, comprising:
   said support plates being respectively front and rear support plates;

said polarizing means comprising a front polarizer and, behind the rear support plate, a metallic, diffusely reflecting reflector, and said front polarizer having a direction of vibration which makes an angle with the orientation direction of the front orientation layer which has an absolute value between 20° and 70°.

9. A liquid crystal display as in claim 8, wherein the angle between the direction of vibration of said front polarizer and the orientation direction of the front orientation layer has a magnitude between 30° and 60°.

10. A liquid crystal display as in claim 1, comprising:
said support plates being respectively front and rear support plates,
said polarizing means comprising a front polarizer and a rear polarizer provided on said front and rear support plates respectively, and
said front polarizer exhibiting a direction of vibration which makes a first angle ($\beta$) with the orientation direction of the front orientation layer and said rear polarizer exhibiting a direction of vibration which makes a second angle ($\gamma$) with the orientation direction of the rear orientation layer, and the absolute values of the angles ($\beta$, $\gamma$) both lie between 20° and 70°.

11. A liquid crystal display as in claim 10, comprising:
a metallic, diffusely reflective reflector provided behind the rear polarizer.

12. A liquid crystal display as in claim 10, wherein the sum of the first angle ($\beta$) and the second angle ($\gamma$) is either approximately equal to ±90° or approximately equal to 0°, with the angle being counted as positive in the clockwise sense in the direction of the incident light.

13. A liquid crystal display as in claim 10, wherein the magnitude of the angles ($\beta$, $\gamma$) both lie between 30° and 60°.

14. A liquid crystal display as in claim 13, comprising:
a metallic, diffusely reflective reflector provided behind the rear polarizer.

15. A liquid crystal display as in claim 13, wherein the sum of the first angle ($\beta$) and the second angle ($\gamma$) is either approximately equal to ±90° or approximately equal to 0°, with the angle being counted as positive in the clockwise sense in the direction of the incident light.

16. A liquid crystal display as in claim 1, comprising:
spacers distributed over the viewing area of the display.

* * * * *